United States Patent
Au

(10) Patent No.: US 6,732,096 B1
(45) Date of Patent: May 4, 2004

(54) OPTIMIZING AN AGGREGATE JOIN QUERY

(75) Inventor: Grace Kwan-On Au, Rancho Palos Verdes, CA (US)

(73) Assignee: NCR Corporation, Dayton, OH (US)

( * ) Notice: Subject to any disclaimer, the term of this patent is extended or adjusted under 35 U.S.C. 154(b) by 302 days.

(21) Appl. No.: 09/918,252

(22) Filed: Jul. 30, 2001

(51) Int. Cl.[7] .............................................. G06F 17/30

(52) U.S. Cl. .............................................. 707/5; 707/2

(58) Field of Search ................................ 707/1, 2, 3, 4, 707/201, 5, 104.1; 345/440

(56) References Cited

U.S. PATENT DOCUMENTS 6,496,819 B1 * 12/2002 Bello et al. ................... 707/3

OTHER PUBLICATIONS

D. Tanjar et al., Aggregate–Join Query Processing in Parallel Database Systems, Feb., 2000, IEEE, pp. 824–829.*

* cited by examiner

Primary Examiner—Diane D. Mizrahi
Assistant Examiner—Apu Mofiz
(74) Attorney, Agent, or Firm—Baker Botts LLP

(57) ABSTRACT

A method and computer system for optimizing queries to a database are disclosed. The query specifies one or more data-to-be-aggregated columns (DAC), one or more explicit aggregation keys (EAK) and one or more join conditions. The query involves table T1. T1 includes the one or more data-to-be-aggregated columns and an aggregation key. All join conditions that involve T1 join the aggregation key of T1 to the unique primary index of another table that is involved in the query. T1 is joined to a table T2 in accordance with a join condition of the aggregate join query. The joining process includes sorting T1 on a sort key that is the aggregation key. Aggregation processing is combined into the step of sorting if T1 is a significant table. Aggregation processing is also combined into the step of sorting if T2 is a significant table and the first join condition is between the aggregation key of T1 and the unique primary index of T2.

21 Claims, 5 Drawing Sheets

OPTIMIZING AN AGGREGATE JOIN QUERY

BACKGROUND

Structured Query Language (SQL) is a standardized language for accessing and updating relational databases. SQL provides a mechanism for creating and maintaining tables, each of which contains rows and columns of information that are collectively assembled into a database. Ideally, the tables are "normalized" in that the structure of the tables avoids data redundancy and allows the resulting data model to be mapped to many different physical database designs. In order to avoid redundancy, yet still be able to display data from multiple tables, SQL provides a mechanism called a "join."

In a join, rows from one table are combined with rows from another table. The rows selected to be combined are determined by a "join condition," which causes a comparison of one column from each of the tables being joined. In a massively parallel processing system in which the rows of each of the tables are distributed among a large number of data storage facilities, the database system "redistributes" one of the tables among the data storage facilities prior to performing the join. The redistribution involves retrieving the table from the data storage facilities and then distributing the rows of the table on the data storage facilities using one side of the join condition as the basis for the distribution. If the other table in the join is distributed using the other side of the join condition as the basis for its distribution, the join for each row will be performed using a single data storage facility.

In one particular type of join query, called an "aggregate join query," data in a column of one of the tables being joined is aggregated (i.e., summed, averaged, counted, etc.). Performing such a query normally requires all the joins to be performed in order for the aggregation processing to be done on the join results.

SUMMARY

In general, in one aspect, the invention features a method for optimizing aggregate join queries to a database. The query specifies one or more data-to-be-aggregated columns (DAC), one or more explicit aggregation keys (EAK) and one or more join conditions. The query involves table T1. T1 includes the one or more data-to-be-aggregated columns and an aggregation key. All join conditions that involve T1 join the aggregation key of T1 to the unique primary index of another table that is involved in the query. T1 is joined to a table T2 in accordance with a join condition of the aggregate join query. The joining process includes sorting T1 on a sort key that is the aggregation key. Aggregation processing is combined into the step of sorting if T1 is a significant table. Aggregation processing is also combined into the step of sorting if T2 is a significant table and the first join condition is between the aggregation key of T1 and the unique primary index of T2.

Implementations of the invention may include one or more of the following. T1 can be an intermediate join result IJR. T1 can also be a database table specified in the query. The aggregation key of T1 can be the EAK of a significant table. The aggregation key of T1 can also be a new aggregation key derived from a significant table. Determining if a table is a significant table can include checking if only one table includes the one or more EAKs. If so, then that table is a significant table. Determining if a table is a significant table can include checking if the set of tables TS that includes all tables that contain at least one of the one or more EAKs, has a member table for which the query includes a join condition between that member table and the unique primary index of every other table in TS. If so, then that member table is a significant table.

In general, in another aspect, the invention features a database system in which an aggregate join query can be optimized. The query specifies one or more data-to-be-aggregated columns (DAC), one or more explicit aggregation keys (EAK) and one or more join conditions. The query involves table T1. T1 includes the one or more data-to-be-aggregated columns and an aggregation key. All join conditions that involve T1 join the aggregation key of T1 to the unique primary index of another table that is involved in the query. The database system includes a massively parallel processing system. That massively parallel processing system includes one or more nodes and a plurality of CPUs, with each of the one or more nodes providing access to the one or more CPUs. Also included are a plurality of processes each of the one or more CPUs providing access to one or more virtual processes with each process configured to manage data stored in one of a plurality of data-storage facilities. The rows of each of the tables specified in the query are distributed among the plurality of data-storage facilities based on respective primary indices for each table. The system also includes a database-management component configured to execute the query in a manner where T1 is joined to a table T2 in accordance with a join condition of the aggregate join query. The joining process includes sorting T1 on a sort key that is the aggregation key. Aggregation processing is combined into the step of sorting if T1 is a significant table. Aggregation processing is also combined into the step of sorting if T2 is a significant table and the first join condition is between the aggregation key of T1 and the unique primary index of T2.

In general, in another aspect, the invention features a computer program, stored on a tangible storage medium, for use in optimizing aggregate join queries to a database. The query specifies one or more data-to-be-aggregated columns (DAC), one or more explicit aggregation keys (EAK) and one or more join conditions. The query involves table T1. T1 includes the one or more data-to-be-aggregated columns and an aggregation key. All join conditions that involve T1 join the aggregation key of T1 to the unique primary index of another table that is involved in the query. The computer program includes executable instructions that cause the computer to join T1 and a table T2 in accordance with a join condition of the aggregate join query. The joining process includes sorting T1 on a sort key that is the aggregation key. The instructions cause the computer to combine aggregation processing into the step of sorting if T1 is a significant table. The instructions also cause the computer to combine aggregation processing into the step of sorting if T2 is a significant table and the first join condition is between the aggregation key of T1 and the unique primary index of T2.

DETAILED DESCRIPTION

Figure 1:
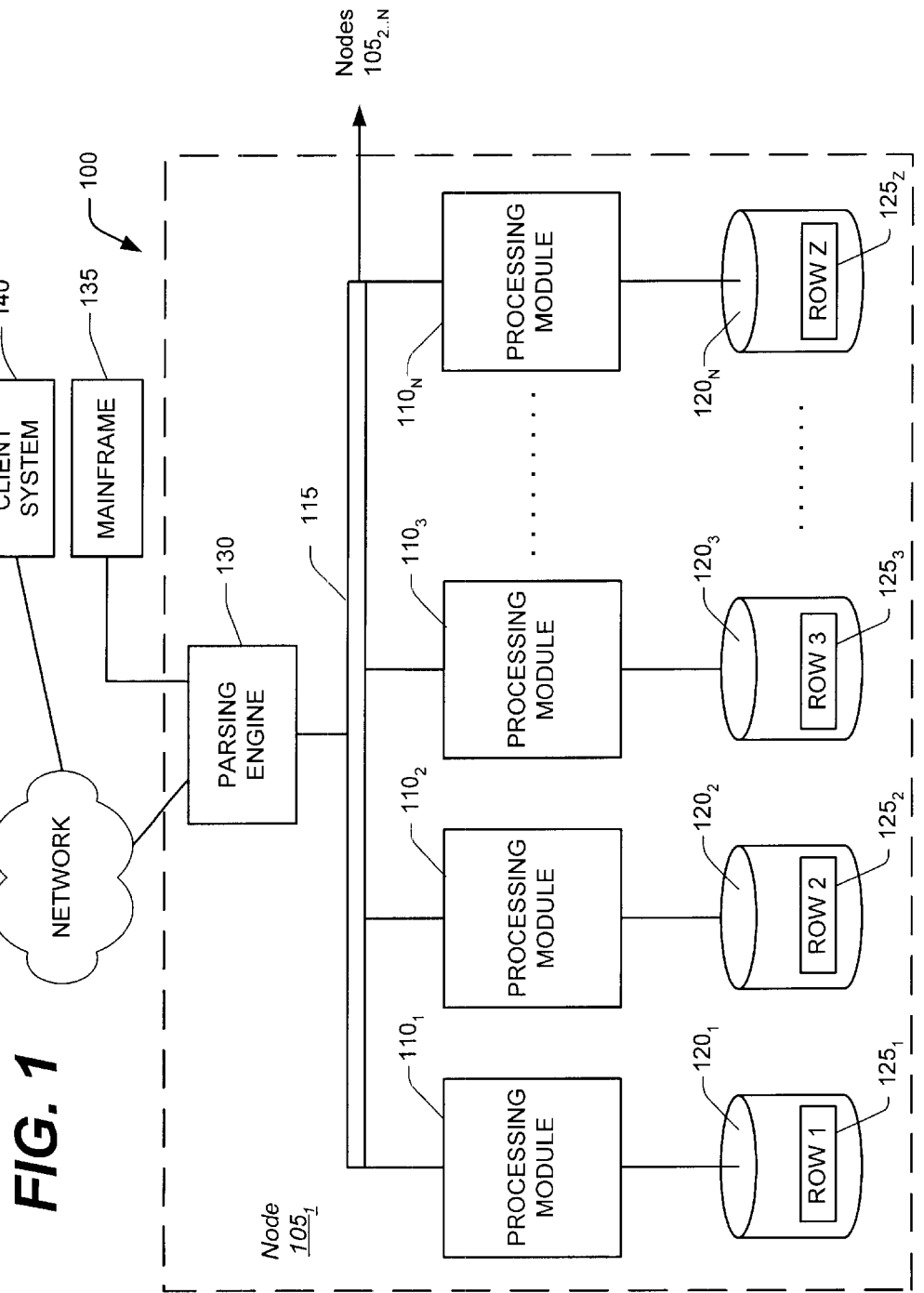
FIG. 1 is a block diagram of a node of a database system.

The query optimization technique disclosed herein has particular application to large databases which might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on a M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries in a standard format, such as SQL.

Figure 2:
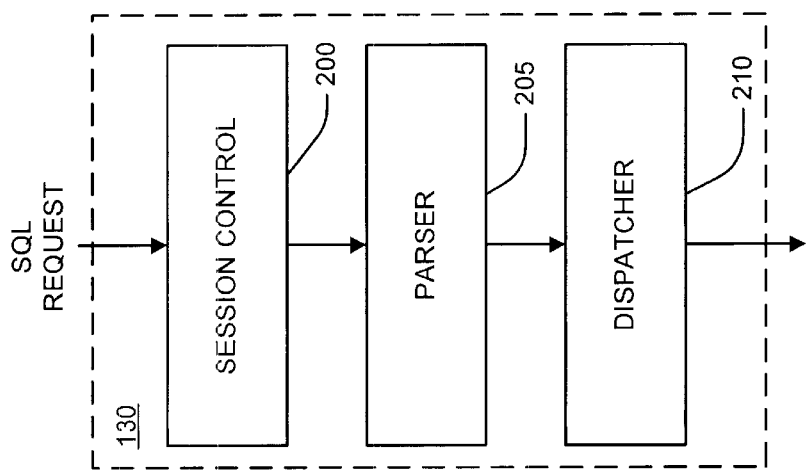
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
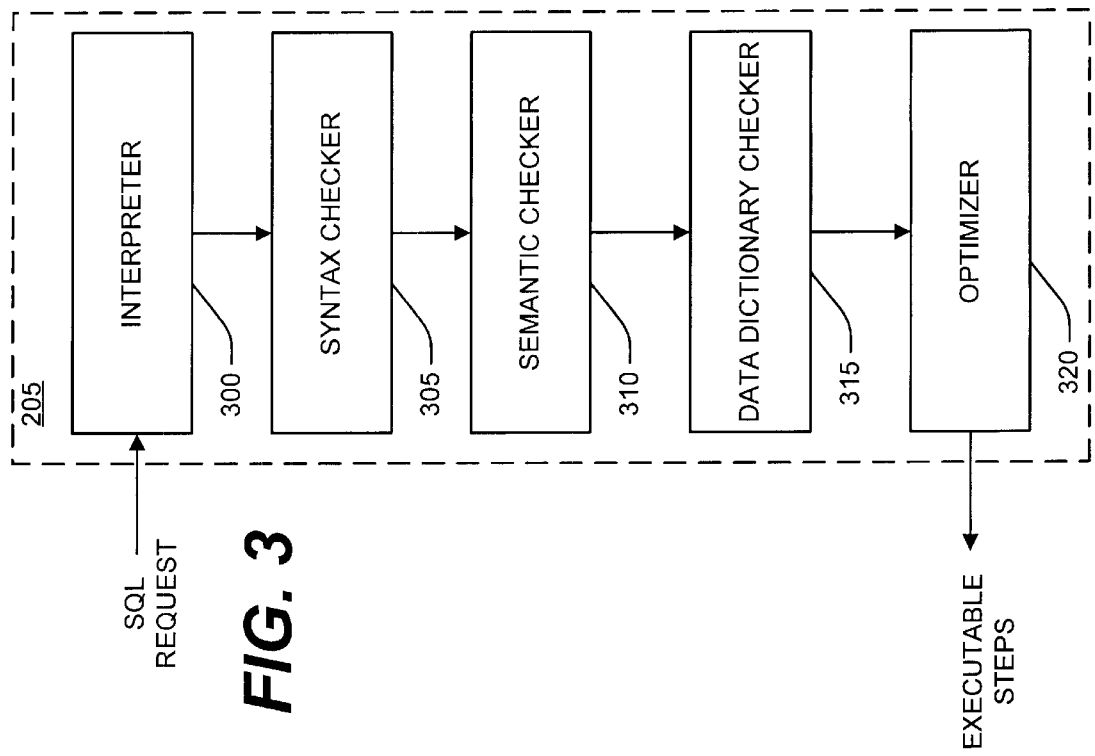
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

An important element of the Teradata Active Data Warehousing System available from NCR Corporation is the "primary index" column that the database system's user assigns for each table. The database system hashes the rows of each table using the primary index column as the basis for the hash and distributes the rows among the data storage facilities $120_{1...N}$ based on the hash results. If the primary index column is properly selected, the "distribution" technique evenly distributes the rows of each table across all of the data storage facilities $120_{1...N}$ in the system. This is especially true if the chosen primary index column has unique values, producing a unique primary index (UPI) and is less true if the chosen primary index column has non-unique values, producing a non-unique primary index (NUPI). The same hashing technique is used to retrieve rows of data from a table. The primary index provides a path to the rows of a table.

In existing systems, an aggregate join query is processed in two parts: the join query is first materialized into a spool (or virtual file), then aggregation is performed on the result spool. For many such queries, this is the necessary processing model because for these queries, all join processing must be carried out to produce the data set for computing the summary data, otherwise the correct result will not be returned. However, for some queries, some or all joins in the query can be delayed to after the completion of aggregation without affecting the result. This is the class of queries addressed herein.

In a parallel system, such as that shown in FIG. 1, join processing requires preparation of the join's input tables, which may involve redistributing one or both of the tables by the join keys which are the columns from the respective tables called out in the join condition (or join predicate). If the join keys for all of the tables involved in the join are the primary indices of their respective tables, then no redistribution and sorting is required. The join may be accomplished by comparing rows from the various tables stored on a single data storage facility.

If one or more of the join keys are not primary indices of their respective tables, however, the optimizer will likely redistribute those tables to increase the efficiency of the query. As discussed above, when a table is created its rows are "distributed" among the data storage facilities based on each row's primary index. A parallel system "redistributes" a table in preparation for a join by accessing its rows in the data storage facilities and copying the rows to data storage facilities based on the join key column of the table. The copying may be to the data storage facility but it may also be to virtual files in memory associated with the processing modules. The result of the redistribution is as if the tables involved in the query are all distributed and sorted based on their join keys.

A system for optimizing a join aggregation query combines aggregation with sorting of an input table to a join if the following conditions are met:
  the table contains the data that is to be aggregated and the aggregation keys;
  the join keys are the same as the aggregation keys; and
  early aggregation does not result in incorrect summary data.

Since aggregation processing requires the rows of the table to be sorted so rows with the same aggregation keys can be grouped together, combining aggregation into the sorting operation only adds a small computational cost to the sort operation. On the other hand, since only one row is written out for a group of rows with a common aggregation key, a combined sort and aggregation operation can be more efficient than a standalone sort.

More importantly, since the input table for which a combined sort and aggregation has been done will have fewer rows, the join for which it is an input will have fewer rows to process. Similarly, the result of the join will be smaller which will improve the efficiency of all following operations that use the join result. Finally, once an early aggregation has been done, the normal final aggregation step is not needed. All of these savings result in performance improvements to those aggregate join queries for which an early aggregation is a correct processing model.

The system for optimizing a join aggregation query detects the class of queries for which an early aggregation is a correct processing model. The system does this by determining if the table that contains the aggregation key is joined to the unique primary index of other tables involved in the query, except for the table containing the data to be aggregated. This rule ensures that any join processing done following the early aggregation does not produce additional rows that need to be included in the aggregation process. This early aggregation optimization is further enhanced by a technique of deriving a new aggregation key from the aggregation keys that are explicitly specified in a query's GROUP BY.

It is semantically correct to derive a new aggregation key associated with table T2, T2. NK, from the set of explicitly specified aggregation keys, {T1.K1, T1.K2, . . .}, if the query contains a join condition "T1.$K_n$=T2. NK" where $K_n$ is the column that comprises the unique primary index of table T1. For example, given the following table definitions:

---

Customer(c_custid,c_name varchar(40),c_address varchar(40), c_nationid int, . . .) unique primary index(c_custid);
Order(o_orderid int,o_custid int,o_totalprice decimal(15,0), . . .) primary index(o_orderid);

---

For the following aggregate join query:

---

Select c_custid, c_name, c_address, sum(o_totalprice)
   From Customer, Order
   Where c_custid = o_custid
   Group By c_custid, c_name, c_address;

---

Using the join condition "c_custid=o_custid", the system derives a new aggregation key, o_custid from the set of explicitly specified aggregation keys {c_custid, c_name, c_address}. This moves the aggregation key from the Customer table to the Order table, which also contains the data to be aggregated (o_totalprice). Consequently, the query qualifies for early aggregation as described above. Thus, when the Order table is redistributed and sorted by o_custid to join with the Customer table, aggregating o_totalprice by o_custid is done as part of the sorting. One example of this combined process creates a copy of a row of the Order table in the data storage facility based on a hash of the o_custid value in that row, if no previously copied row exists having that o_custid value. If a previously copied row for that o_custid value does exist, the o_totalprice values are added together in the previously copied row. The result is a more efficient join process for the Customer and Order tables in which the final aggregation operation is not needed.

Figure 4:
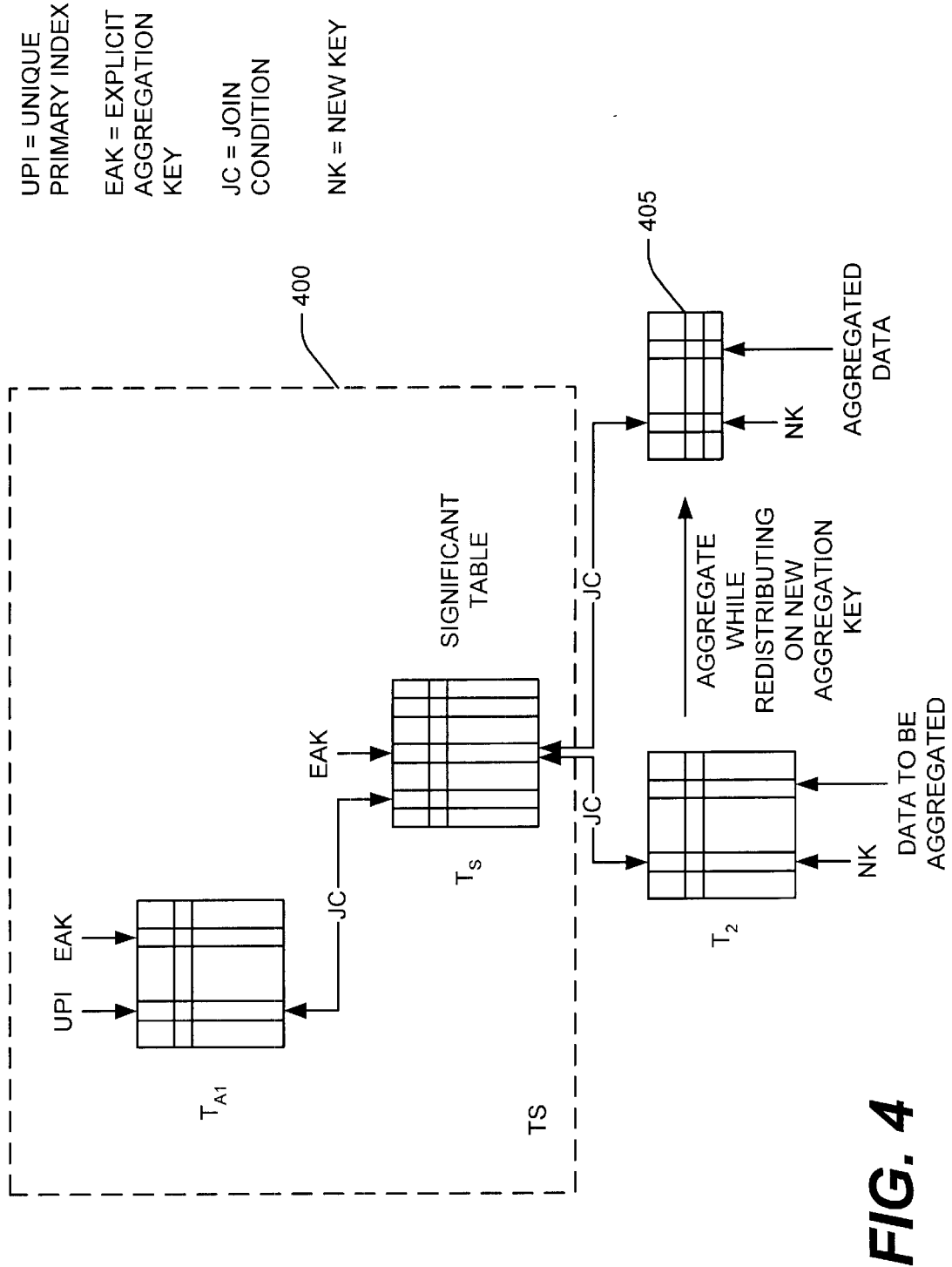
FIG. 4 illustrates the relationships between tables that qualify for early aggregation.

When the set of explicit aggregation keys consists of columns from multiple tables, the system determines if there is only one "significant table" out of the multiple tables. The process identifies a set of tables TS 400, shown in FIG. 4, which include the explicit aggregation keys (EAKs) called out in the query. In the example shown in FIG. 4, TS includes tables $T_S$ and $T_A$, because each of those tables includes an EAK from the query. The TS can include any number of tables. For example, if five EAKs are called out in the query and two are located in one table with the other three each located in a different table, those four tables are included in the TS. $T_s \in TS$ is said to be the significant table if for every $T_i \in TS$, $T_i \neq T_s$, the query contains a join condition (JC) of the form "$T_s.b=T_i.a$" where a is the column that comprises the unique primary index (UPI) of $T_i$. In the example shown in FIG. 4, $T_S$ is the significant table because it includes a join condition with the UPI column of the other table in TS, $T_A$. If the system can successfully reduce TS to a single significant table $T_s$, it can attempt to move the explicit aggregation key from $T_s$ to the new aggregation key NK in $T_2$, as discussed above and as shown in FIG. 4. The data to be aggregated within $T_2$ can then be aggregated as $T_2$ is being redistributed in preparation for the join with $T_s$. As illustrated in FIG. 4, the early aggregation result 405 is a table that is likely smaller than $T_2$, which means that the join with $T_S$ will be more efficient. It can be appreciated that this process will apply no matter how many tables are in the set TS, as long as a significant table $T_S$ can be determined. The remaining elements of the query, including the join with $T_A$, can then be executed.

For example, given an additional table definition:

Nation (n_nationid, n_name, . . . ) unique primary index (n_nationid);

For the following user query:

---

Select c_custid, c_name, c_address, n_name, sum(o_totalprice)
   From Customer, Order, Nation
   Where  c_custid = o_custid and
          c_nationid = n_nationid
   Group By c_custid, c_name, c_address, n_name;

---

TS={Customer, Nation}, because all of the columns in the "GROUP BY" portion of the query are from the Customer table or the Nation table. In this example, the system determines that Customer is the significant table because the query includes the join condition "c_nationid=$n_{13}$ nationid", and $n_{13}$ nationid is the unique primary index of the Nation table. Nation is not the significant table because the query does not include a join condition to the unique primary index of the Customer table. Having determined that Customer is the significant table, the system can derive the new aggregation key, o_custid, from the join condition "c_custid=o_custid" so that this query also qualifies for early aggregation.

Figure 5:
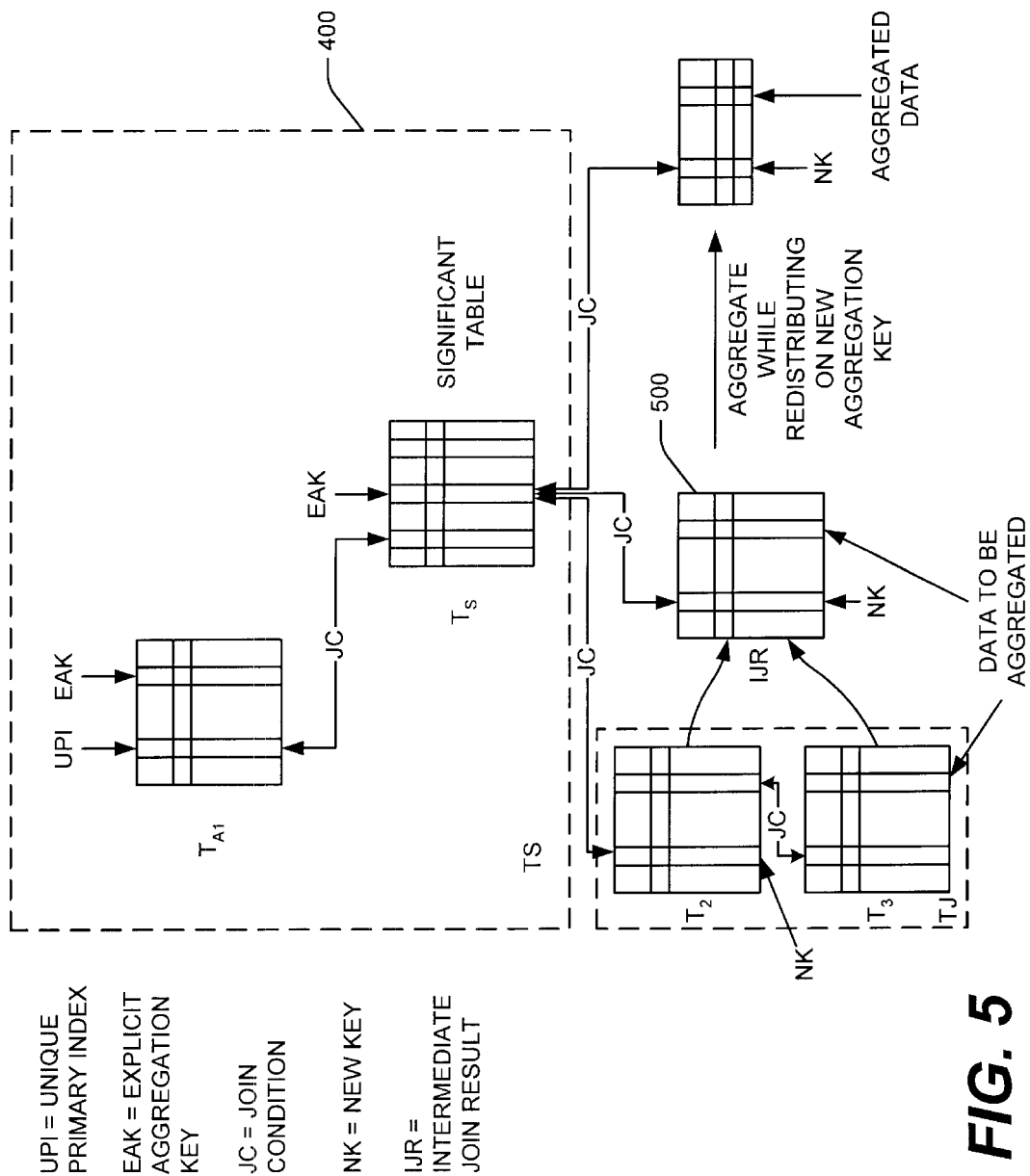
FIG. 5 illustrates the relationships between tables that qualify for early aggregation.

As long as early aggregation is the correct processing model for a query, the new aggregation key can be from one table $T_2$ and aggregation data can be from another table $T_3$, as shown in FIG. 5. In that case, the combined sort and aggregation optimization is applied to the intermediate join result (IJR) 500 where the aggregation key and the aggregation data come together.

For example, given an additional table definition:

---

OrderDetail    (d_orderid int, d_detailid int, d_price decimal (15,0),
               d_discount decimal (15,0), . . .) primary index
               (d_orderid);

---

For the following user query:

```
Select c_custid, c_name, c_address, n_name, sum(d_price*
(1-d_discount))
    From Customer, Order, Nation, OrderDetail
    Where   c_custid = o_custid and
            c_nationid = n_nationid and
            o_orderid = d_orderid
    Group By c_custid, c_name, c_address, n_name;
```

Using the algorithms described earlier, the system reduces the table set containing explicit aggregation keys to one significant table, Customer, and derives a new aggregation key, o_custid. As a result, the aggregation key is from the Order table and the aggregation data is from the OrderDetail table. Assuming that the join plan for this query is (((Order join OrderDetail) join Customer) join Nation), the join result of Order and OrderDetail will have both the aggregation key and the aggregation data. The system applies the combined sort and aggregation optimization algorithm as the join spool is redistributed for the join with the Customer table.

Figure 6:
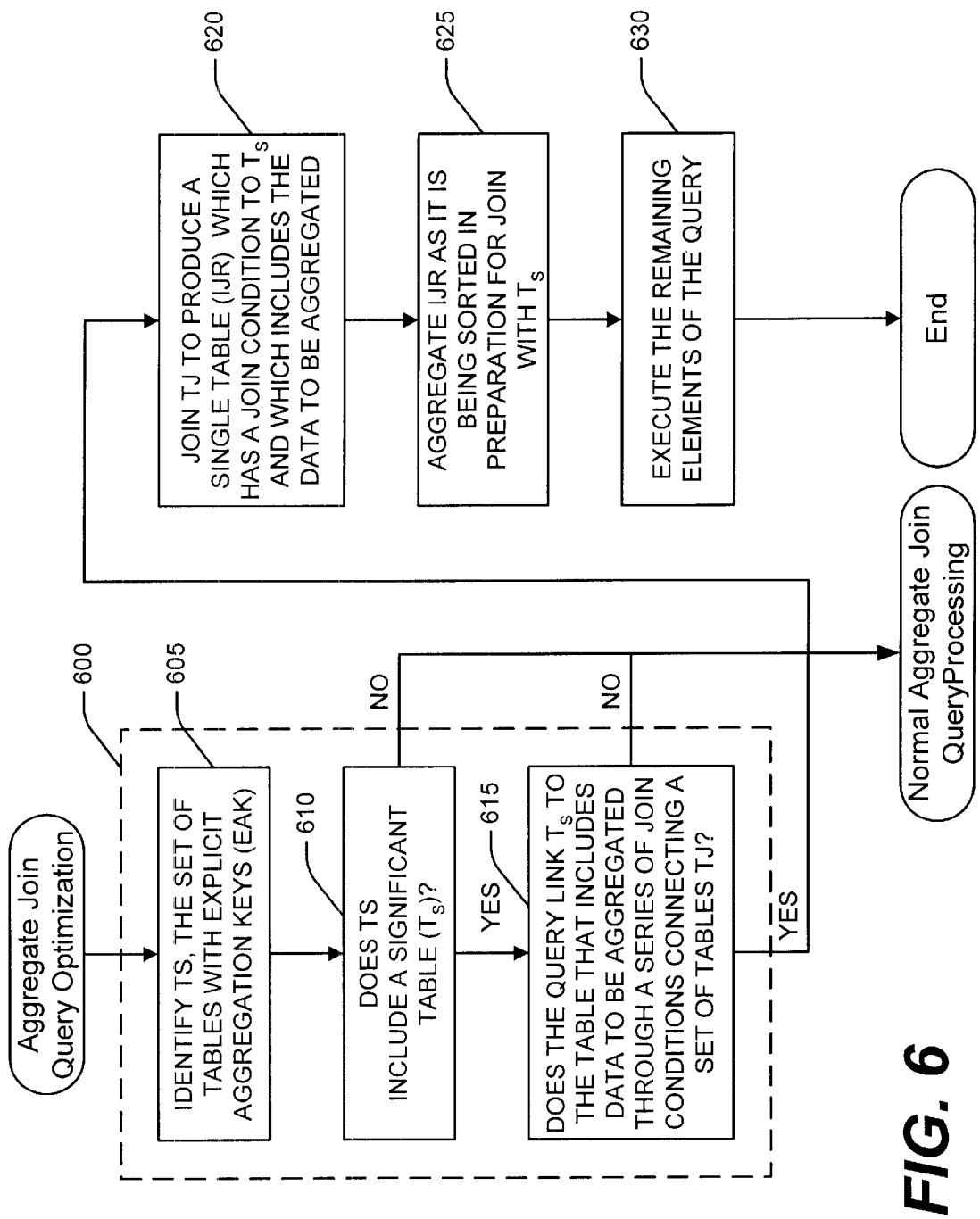
FIG. 6 is a flow chart of an aggregate join query optimization.

The combined sort and aggregation optimization algorithm, illustrated in FIG. 6, includes a multi-step process for determining whether a particular aggregate join query qualifies for early aggregation (block 600). The multi-step process for determining whether a particular aggregate join query qualifies for early aggregation may be performed by the optimizer 320. The process begins by identifying TS, the set of tables with explicit aggregation keys (EAK) in the query (block 605). In the third example discussed above, TS includes the Customer and Nation tables.

In the next step for determining if the query qualifies for early aggregation, the algorithm determines whether TS includes a significant table $T_S$ (block 610). If TS has only one table, then that table is the significant table ($T_S$), otherwise the method described above is used. In particular, the algorithm tests every member of TS to determine if that particular member has join conditions to the unique primary indices of all of the other members of TS. In the example discussed above, the Customer table is the significant table because of the join condition "c_nationid=n_nationid" which joins a column of the Customer table with the unique primary index of the Nation table. If TS does not include a significant table, the system performs normal aggregate join query processing.

If TS does include a significant table, the next step for determining if the query qualifies for early aggregation involves determining (a) if a new aggregation key can be derived for one of a set of table TJ to be joined under the query by looking for a join condition (JC) between the unique primary index of the significant table $T_S$ and a member of TJ (b) whether one or more of the members of TJ includes the data to be aggregated (block 615). In the third example discussed above, TJ includes the Order table and the OrderDetail table. They are to be joined under the join condition "$o_{13}$ orderid=$d_{13}$ orderid." There is a join condition between one member of TJ and $T_S$ in "c_custid= o_custid." This allows a new aggregation key, o_custid, to be derived. The other members of TJ includes the data to be aggregated "($d_{13}$ price* (1-d_discount))." In some situations, such as the first and second examples described above, TJ includes a single table. In that case, the processing in block 615 would reduce to determining if there is a join condition between the single table in TJ and the significant table. If this condition is not met, the system performs normal aggregate join query processing. If TJ contains other members that do not include the new derived aggregation key nor the data to be aggregated, the algorithm will determine if the query qualifies for early aggregation by determining if the table with the new derived aggregation key is joined to the unique primary indices of these tables. This further increases the variety of queries that can qualify for the early aggregation optimization.

Once the system determines that the query qualifies for early aggregation (under block 600) and that TJ includes more than one table, the aggregation key and the data to be aggregated will be contained in a single intermediate join result table (IJR) if the system first joins the tables in TJ that include the derived aggregation key and the data to be aggregated (block 620). This is illustrated in FIG. 5, in which $T_2$ and $T_3$ are joined to produce the intermediate join result, IJR. In the third example, discussed above, the Order table and OrderDetail table are joined to produce the intermediate join result. If the TJ includes only a single table, that table is designated as the IJR.

The IJR now contains the data to be aggregated and the aggregation key. If the next step in the execution of the query is to join IJR with the significant table, which requires redistributing and sorting IJR by the join key, the aggregation key and the sort key will be the same column. In that case the aggregation required by the query can be accomplished as the IJR is being sorted (block 625). This is illustrated in FIGS. 4 and 5, in which $T_2$ and the IJR, respectively, are aggregated as they are being sorted.

Finally, the system executes the remaining elements of the query (block 630). Since the redistributed and aggregated IJR (or $T_2$, in the case of FIG. 4) has fewer rows than the original, the remaining steps can be executed more efficiently.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

I claim:

1. A method for optimizing an aggregate join query that specifies one or more data-to-be-aggregated columns (DAC), one or more explicit aggregation keys (EAK) and one or more join conditions, and that involves table T1, T1 including the one or more data-to-be-aggregated columns and an aggregation key, whereby all join conditions that involve T1 join the aggregation key of T1 to the unique primary index of another table that is involved in the query, the method including the steps of:

joining T1 to a table T2 in accordance with a first join condition of the aggregate join query, the step of joining including sorting T1 on a sort key that is the aggregation key;

combining aggregation processing into the step of sorting if either:
   (a) T1 is a significant table or
   (b) T2 is a significant table and the first join condition is between the aggregation key of T1 and the unique primary index of T2.

2. The method of claim 1, wherein T1 is an intermediate join result table IJR.

3. The method of claim 2, wherein the IJR resulted from the following steps:

identifying the set TJ of tables linked by join conditions, TJ including all of the one or more DACs; and deriving a new aggregation key (NK) for table T3, a member of TJ, from a join condition in the query that joins T3. NK to the unique primary index of the significant table.

4. The method of claim 2, wherein the IJR resulted from the following steps:
identifying a set TJ of tables linked by join conditions where TJ includes all of the one or more DACs and the query contains at least one join condition between a member of TJ and the unique primary index index of T2 and joining the member tables of TJ to form the IJR.

5. The method of claim 4, wherein the set TJ has the smallest possible number of member tables.

6. The method of claim 1, wherein determining if a table is a significant table includes
if only one table includes the one or more EAKs, then that table is a significant table; otherwise
if the set of tables TS that includes all tables that contain at least one of the one or more EAKs, has a member table for which the query includes a join condition between that member table and the unique primary index of every other table in TS, then that member table is a significant table.

7. The method of claim 1 further comprising the step of performing the remaining joins in the query.

8. A database system in which an aggregate join query can be optimized, the query specifying one or more data-to-be-aggregated columns (DAC), one or more explicit aggregation keys (EAK) and one or more join conditions, and that involves table T1, T1 including the one or more data-to-be-aggregated columns and an aggregation key, whereby all join conditions that involve T1 join the aggregation key of T1 to the unique primary index of another table that is involved in the query, the database system comprising:
a massively parallel processing system comprising:
one or more nodes;
a plurality of CPUs, each of the one or more nodes providing access to one or more CPUs;
a plurality of processes each of the one or more CPUs providing access to one or more virtual processes;
each process configured to manage data stored in one of a plurality of data-storage facilities;
the rows of each of the tables specified in the query being distributed among the plurality of data-storage facilities based on respective primary indices for each table;
a database-management component configured to execute the query by joining T1 to a table T2 in accordance with a first join condition of the aggregate join query, the step of joining including sorting T1 on a sort key that is the aggregation key;
combining aggregation processing into the step of sorting if either:
(a) T1 is a significant table or
(b) T2 is a significant table and the first join condition is between the aggregation key of T1 and the unique primary index of T2.

9. The database system of claim 8 wherein T1 is an intermediate join result table IJR.

10. The database system of claim 9, wherein the IJR resulted from identifying a set TJ of tables linked by join conditions where TJ includes all of the one or more DACs and the query contains at least one join condition between a member of TJ and the unique primary index index of T2 and joining the member tables of TJ to form the IJR.

11. The database system of claim 10, wherein T2 is the significant table and joining the member tables of TJ to form the IJR comprises deriving a new aggregation key (NK) for table T3, a member of TJ, from a join condition that joins T3.NK to the unique primary index of the significant table and joining T1 and T3 to form a IJR that includes the one or more data-to-be-aggregated columns and an aggregation key.

12. The database system of claim 11, wherein the set TJ has the smallest possible number of member tables.

13. The database system of claim 8, wherein determining if a table is a significant table includes
if only one table includes the one or more EAKs, then that table is a significant table; otherwise
if the set of tables TS that includes all tables that contain at least one of the one or more EAKs, has a member table for which the query includes a join condition between that member table and the unique primary index of every other table in TS, then that member table is a significant table.

14. The database system of claim 8, wherein the database-management component is configured to further execute the query by performing the remaining joins in the query.

15. A computer program, stored in a tangible medium, that can accept a query specifying one or more data-to-be-aggregated columns (DAC), one or more explicit aggregation keys (EAK) and one or more join conditions, and that involves table T1, T1 including the one or more data-to-be-aggregated columns and an aggregation key, whereby all join conditions that involve T1 join the aggregation key of T1 to the unique primary index of another table that is involved in the query; the program comprising executable instructions that cause a computer to:
join T1 to a table T2 in accordance with a first join condition of the aggregate join query, the joining including sorting T1 on a sort key that is the aggregation key; and
combine aggregation processing into the sorting if either:
(a) T1 is a significant table or
(b) T2 is a significant table and the first join condition is between the aggregation key of T1 and the unique primary index of T2.

16. The program of claim 15, wherein T1 is an intermediate join result table IJR.

17. The program of claim 16, wherein the IJR resulted from executable instructions causing the computer to:
identify a set TJ of tables linked by join conditions where TJ includes all of the one or more DACs and the query contains at least one join condition between a member of TJ and the unique primary index index of T2 and join the member tables of TJ to form the IJR.

18. The program of claim 17, wherein T2 is the significant table and joining the member tables of TJ to form the IJR comprises deriving a new aggregation key (NK) for table T3, a member of TJ, from a join condition that joins T3.NK to the unique primary index of the significant table and joining T1 and T3 to form a IJR that includes the one or more data-to-be-aggregated columns and an aggregation key.

19. The program of claim 18, wherein the set TJ has the smallest possible number of member tables.

20. The program of claim 15, wherein determining if a table is a significant table includes
if only one table includes the one or more EAKs, then that table is a significant table; otherwise
if the set of tables TS that includes all tables that contain at least one of the one or more EAKs, has a member table for which the query includes a join condition between that member table and the unique primary index of every other table in TS, then that member table is a significant table.

21. The program of claim 15 further comprising the step of performing the remaining joins in the query.

* * * * *